US011456495B2

(12) United States Patent
Brinkmann et al.

(10) Patent No.: US 11,456,495 B2
(45) Date of Patent: Sep. 27, 2022

(54) SYSTEMS AND METHODS FOR CONTROLLING THE TEMPERATURE OF A BATTERY AND OF OTHER ELECTRIC COMPONENTS OF A VEHICLE

(71) Applicant: FORD GLOBAL TECHNOLOGIES, LLC, Dearborn, MI (US)

(72) Inventors: Bernd Brinkmann, Dormagen (DE); Thomas Nitsche, Neuss (DE); Julian Tietze, Cologne (DE); Christian Jolk, Cologne (DE); Bernhard Gralka, Berg.-Gladbach (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 534 days.

(21) Appl. No.: 16/016,758

(22) Filed: Jun. 25, 2018

(65) Prior Publication Data

US 2019/0020078 A1 Jan. 17, 2019

(30) Foreign Application Priority Data

Jul. 12, 2017 (DE) .......................... 102017211929.2
Oct. 5, 2017 (DE) .......................... 102017217685.7

(51) Int. Cl.
*H01M 10/633* (2014.01)
*H01M 10/6568* (2014.01)
(Continued)

(52) U.S. Cl.
CPC ........... *H01M 10/633* (2015.04); *B60L 58/26* (2019.02); *B60L 58/27* (2019.02); *H01M 10/486* (2013.01);
(Continued)

(58) Field of Classification Search
CPC ...... B60L 58/26; B60L 2240/36; B60L 58/27; B60H 1/00278; B60H 2001/00307;
(Continued)

(56) References Cited

U.S. PATENT DOCUMENTS 8,402,776 B2 3/2013 Johnston et al.
2001/0040061 A1* 11/2001 Matuda ................. B60W 10/30
165/41

(Continued)

FOREIGN PATENT DOCUMENTS

JP 2016-97922 5/2016

OTHER PUBLICATIONS

Joshua Kurtis Carroll, et al., Active battery thermal management within electric and plug-in hybrid electric vehicles, SAE International, Paper #2016-01-2221, Published Oct. 17, 2016, http://papers,sae.org/2016-01-2221/.

*Primary Examiner* — Imran Akram
(74) *Attorney, Agent, or Firm* — David B. Kelley; Carlson, Gaskey & Olds, P.C.

(57) ABSTRACT

This disclosure relates to systems/arrangements and methods for controlling a temperature of a battery and of other electric components of a vehicle, and of a vehicle that includes such a system. An exemplary system may include a temperature control circuit, a battery arranged in a first section of the temperature control circuit, other electric components arranged in a second section of the temperature control circuit that is arranged in parallel with the first section, a flow control device for dividing a flow of a temperature control medium between the first and second sections, a battery temperature sensor for determining the battery temperature, a temperature sensor for determining the temperature of the other electric components, and a control unit configured to receive and process input data from the temperature sensors and to output a control signal (Continued)

to the flow control device in order to control the division of the flow of the temperature control medium between the first and second sections in accordance with the temperatures determined.

20 Claims, 2 Drawing Sheets

(51) Int. Cl.
| | | |
|---|---|---|
| *H01M 10/667* | (2014.01) | |
| *H01M 10/625* | (2014.01) | |
| *B60L 58/26* | (2019.01) | |
| *H01M 10/6563* | (2014.01) | |
| *B60L 58/27* | (2019.01) | |
| *H01M 10/48* | (2006.01) | |
| *H01M 10/613* | (2014.01) | |
| *H01M 10/6566* | (2014.01) | |

(52) U.S. Cl.
CPC ....... *H01M 10/613* (2015.04); *H01M 10/625* (2015.04); *H01M 10/6563* (2015.04); *H01M 10/6566* (2015.04); *H01M 10/6568* (2015.04); *H01M 10/667* (2015.04); *B60L 2240/36* (2013.01); *B60L 2240/525* (2013.01); *B60L 2240/545* (2013.01); *H01M 2220/20* (2013.01)

(58) Field of Classification Search
CPC ............ B60H 1/00392; B60H 1/00642; B60H 1/143; Y02T 10/705; Y02T 90/16; Y02T 10/7005; Y02T 10/7077; H01M 10/625; H01M 10/6568; H01M 2220/20; H01M 10/633; H01M 10/6556; H01M 10/66; H01M 10/667

See application file for complete search history.

(56) References Cited

U.S. PATENT DOCUMENTS

| | | | | |
|---|---|---|---|---|
| 2002/0184908 | A1* | 12/2002 | Brotz | ...................... B60H 1/143 |
| | | | | 62/198 |
| 2005/0167169 | A1* | 8/2005 | Gering | ...................... B60H 1/08 |
| | | | | 237/12.3 B |
| 2009/0139781 | A1* | 6/2009 | Straubel | .................. B60L 53/14 |
| | | | | 701/22 |
| 2010/0089669 | A1* | 4/2010 | Taguchi | .................. B60L 58/15 |
| | | | | 180/65.1 |
| 2012/0297809 | A1* | 11/2012 | Carpenter | ............... B60L 58/26 |
| | | | | 62/239 |
| 2013/0111932 | A1* | 5/2013 | Mishima | ........... H01M 10/6568 |
| | | | | 62/159 |
| 2014/0041826 | A1* | 2/2014 | Takeuchi | .................. B60L 1/02 |
| | | | | 165/10 |
| 2014/0193683 | A1* | 7/2014 | Mardall | ........... H01M 10/6562 |
| | | | | 429/99 |
| 2014/0216709 | A1 | 8/2014 | Smith et al. | |
| 2015/0194711 | A1 | 7/2015 | Rawlinson | |
| 2015/0360675 | A1 | 12/2015 | Nefcy et al. | |
| 2016/0318410 | A1 | 11/2016 | Rawlinson | |
| 2018/0147952 | A1* | 5/2018 | Kwon | ................ G01R 31/3828 |

* cited by examiner

SYSTEMS AND METHODS FOR CONTROLLING THE TEMPERATURE OF A BATTERY AND OF OTHER ELECTRIC COMPONENTS OF A VEHICLE

CROSS-REFERENCE TO RELATED APPLICATIONS

This application claims priority to German Application No. 102017211929.2 filed on Jul. 12, 2017 and German Application No. 102017217685.7, filed on Oct. 5, 2017, the entire disclosures of which are incorporated by reference herein.

BACKGROUND

The present disclosure relates to an arrangement and a method for controlling the temperature of a battery and of other electric components of a vehicle. Moreover, a vehicle that has an arrangement of this kind is specified.

Electric drive systems or electric hybrid drive systems are increasingly being used in vehicles. The batteries, in particular the battery for storing driving energy, and other electric components of a drive system of this kind, e.g. electric motors, particularly the electric motor for driving the vehicle, a generator, the power electronics etc., are supposed to be operated within a narrow temperature range, and this temperature range can differ for the different electric components.

Currently, temperature control of electric components of this kind is usually achieved by using temperature control systems that have temperature control circuits. These temperature control circuits are often of very complex design to enable the required temperature control of the electric components. For example, temperature circuits of this kind have a multiplicity of water-to-air heat exchangers and several electric pumps.

Owing to the large space requirement in the restricted installation space in the frontal area of vehicles and owing to an excessive air-side pressure drop across the heat exchangers, the known temperature control systems, e.g. cooling systems, are unusable in many applications or give rise to disadvantages, such as a reduced power of the air-conditioning system under idling conditions.

It is therefore an object of the present disclosure to specify a possibility for reducing or eliminating these disadvantages.

This object is achieved by the subject matter of the independent claims. The dependent claims contain variant embodiments of these solutions according to the invention.

It is a basic concept of the disclosure to reduce the number of heat exchangers and electric pumps in a temperature control system for controlling the temperature of the battery and electric components in a vehicle having an electric drive, e.g. an electric vehicle or a hybrid electric vehicle, by arranging the components skillfully in the temperature control system and providing additional devices, e.g. switchable air ducts.

An important basic precondition for this is the fact that the electric components generate a comparatively low heat flow and have a high heat capacity (thermal mass), in comparison with metallic components for example. The result is a comparatively small temperature change over time.

According to this disclosure, provision is made to arrange the battery in parallel with other electric components in the temperature control circuit since the battery has a very small temperature range in which optimum capacity to function can be ensured. The flow of the temperature control medium for controlling the temperature of the battery and of the other electric components, which are arranged in parallel, and hence the temperature of the battery and of the other electric components can be subjected to open-loop or closed-loop control by a flow control device, e.g. by a three-way valve.

The solution according to this disclosure makes it possible to reduce the space requirement since fewer heat exchangers and pumps are needed. Moreover, more rapid heating of the electric components, particularly of the battery, can be achieved, since, among other factors, the number of heat transfer processes can be reduced.

SUMMARY

An arrangement according to the disclosure for controlling the temperature of a battery and of other electric components of a vehicle has a temperature control circuit, through which a temperature control medium flows, a battery arranged in a first section of the temperature control circuit and other electric components arranged in a second section, wherein the first section and the second section are arranged in parallel with one another.

The temperature control circuit is used to control the temperature, that is to say, depending on requirements, to heat or cool the battery and the other electric components. As is customary, the temperature control circuit has lines for fluid connection, e.g. pipes or hoses, at least one pumping device for producing a flow of temperature control medium, and at least one heat exchanger for heat transfer between the temperature control medium and another liquid or gaseous medium.

The heat exchanger can be designed as a low-temperature radiator (LTR), for example, and can be used for heat transfer between ambient air and the temperature control medium. Since excess heat energy is dissipated to the ambient air, for example, a low-temperature radiator of this kind does not require any additional energy supply. There can be a fan which assists heat transfer by the low-temperature radiator. At high outside temperatures, e.g. if the ambient temperature is above the optimum temperature range of the battery of which the temperature is to be controlled, the cooling effect of the low-temperature radiator may not be sufficient, however, since the minimum temperature that the temperature control medium can reach is the ambient temperature. The use of a further heat exchanger, e.g. a refrigerant-operated heat exchanger, may therefore be necessary.

The heat exchanger in the temperature control circuit can also be designed as a temperature control medium/refrigerant heat exchanger, for example, or the temperature control circuit can have a temperature control medium/refrigerant heat exchanger in addition to the low-temperature radiator. By the temperature control medium/refrigerant heat exchanger, adjustment of the temperature of the temperature control medium to a temperature below the ambient temperature, as may be necessary, for example, when the outside temperatures are high, is also possible. However, the temperature control medium/refrigerant heat exchanger requires additional energy to drive the air-conditioning compressor and the fan for cooling the condenser.

It may therefore be advantageous if the temperature control circuit has both a low-temperature radiator and a temperature control medium/refrigerant heat exchanger, wherein the latter is used only at high outside temperatures so as to minimize the energy requirement.

The low-temperature radiator and the temperature control medium/refrigerant heat exchanger can be arranged in parallel with one another in the temperature control circuit, for example, making it possible to use flow control devices, e.g. three-way valves, to determine whether the temperature of the temperature control medium is to be controlled by the low-temperature radiator, by the temperature control medium/refrigerant heat exchanger or by both. As an option, a bypass arranged in parallel with the low-temperature radiator and in parallel with the temperature control medium/refrigerant heat exchanger can be provided, so that, depending on requirements, the temperature control medium flows neither through the low-temperature radiator nor through the temperature control medium/refrigerant heat exchanger.

A liquid or gaseous medium, e.g. water or air, can be used as the temperature control medium.

The temperature control circuit may have two sections arranged in parallel with one another in terms of flow, the first section and the second section. That is to say that, starting from a junction, a flow of temperature control medium flowing in the temperature control circuit is divided between a first partial volume flow flowing in the first section and a second partial volume flow flowing in the second section before the two partial flows come together again at a second junction and together form the flow of temperature control medium again.

The battery may be a battery for storing electric energy for driving the vehicle. This battery is arranged in the first section of the temperature control circuit, i.e. its temperature is controlled by the first partial volume flow. Batteries of this kind generally have a narrow temperature range in which a sufficient capacity to function can be ensured. This temperature range can be between 30° C. and 40° C., for example.

The other electric components can be the power electronics of the vehicle, for example. The other electric components generally likewise have a limited temperature range in which a sufficient functionality is assured. In comparison with the temperature range of the battery, however, the temperature range of the other electric components is generally wider and can be between 30° C. and 70° C., for example.

Furthermore, the arrangement according to the disclosure may include a flow control device for dividing the flow of temperature control medium between the first section and the second section of the temperature control circuit, i.e. for division between the first and the second partial volume flow. The flow control device can be designed as a three-way valve or a three-way servo valve, for example.

The division of the flow of temperature control medium can be time-based, with the flow of temperature control medium periodically flowing only through the first section or only through the second section, for example, because the flow control device temporarily opens and closes the first and second sections. The respective duration of the open or closed condition, i.e. the period of time in which the temperature control medium flows through the first or second section, is dependent on the required temperature control of the battery and of the other electric components. For example, provision can be made for the flow of temperature control medium to flow through the first section for 20 to 120 seconds and then to flow through the second section for 20 to 120 seconds.

Time-based division can be achieved easily, e.g. by a three-way valve, which is controlled accordingly. Since there are only two states, namely flow and non-flow, for both sections, heat transfer between the temperature control medium and the battery or other electric components is simple to predict since, for example, the flow rate during flow is always the same.

The flow of temperature control medium can also be divided according to quantity, that is to say, for example, with regard to the volume or mass. For example, it can be divided in such a way that 80% of the volume flow of temperature control medium flows in the first section and 20% of the volume flow of temperature control medium flows in the second section.

Moreover, the arrangement according to the disclosure may include a battery temperature sensor for determining the battery temperature, a temperature sensor for determining the temperature of the other electric components, and a control unit designed to receive and process input data from the temperature sensors and to output a control signal to the flow control device in order to control the division of the flow of temperature control medium between the first section and the second section of the temperature control circuit in accordance with the temperatures determined.

In other words, the control unit receives input data from the temperature sensors, processes these input data, and triggers the flow control device as an actuator in response to the processed input data based on instructions corresponding to one or more control routines.

It is also possible for the control unit to be designed as a closed-loop control unit and for the flow control device to be designed as a flow regulating device for closed-loop control of the temperature of the battery and/or of the other electric components, wherein there is feedback of the measurement signals of the temperature sensors. It is thereby possible to monitor compliance with a temperature range specified for the battery and/or the other electric components and to automatically perform temperature control if there is a deviation.

According to various variant embodiments, the arrangement can furthermore have a controllable air flap system (active grill shutter), wherein the control unit is additionally designed to output a control signal to the air flaps of the air flap system in order to control the temperature control of the temperature control medium in accordance with the temperatures determined. Closed-loop control can also be provided by closed-loop control of the air flaps in accordance with the temperatures determined.

For example, the position of the air flaps can be modified in such a way that more or less air flows through the air flaps, thus allowing a correspondingly greater or smaller cooling effect to be achieved. As an option, there is the possibility of controlling groups of air flaps differently, either by open-loop or closed-loop control. For example, a group of air flaps which is at the top in relation to the vehicle can be closed and a lower group of air flaps can be opened. This can allow more precise temperature control and an extension of the possible temperature range.

The air flap system can be arranged adjacent to the low-temperature radiator and can control the air supplied to the low-temperature radiator.

The use of a controllable air flap system can allow the elimination of a bypass arranged in the temperature control circuit in parallel with the low-temperature radiator and the elimination of a flow control device associated with the bypass, e.g. if the air flap system can reduce or even prevent heat transfer between the temperature control medium and the ambient air in the low-temperature radiator in a state with closed air flaps, as may be the case, for example, at very low or very high outside temperatures.

According to other variant embodiments, the arrangement according to the disclosure can include a temperature control medium/oil heat exchanger and an oil temperature determination device, e.g. an oil temperature sensor, for determining the temperature of an oil flowing through the temperature control medium/oil heat exchanger, wherein the control unit is additionally designed to receive and process input data from the oil temperature determination device, that is to say, for example, from the oil temperature sensor, and to output a control signal to the flow control device in order to control the division of the flow of temperature control medium between the first section and the second section of the temperature control circuit in accordance with the temperatures determined, i.e. the battery temperature, the temperature of the other electric components and the oil temperature.

The oil temperature can be calculated in accordance with the driving state, ambient temperature, etc. using a suitable model, for example, or can be measured in the feed line to the temperature control medium/oil heat exchanger, for example.

It is possible, for example, for the temperature control medium/oil heat exchanger to be designed as a plate heat exchanger, e.g. as a plate heat exchanger of the kind usually used to cool transmission oil.

The temperature control medium/oil heat exchanger can be used to transfer heat between the temperature control medium and an oil flowing in another circuit, wherein the oil can be used to control the temperature of the transmission, the electric motor and/or the generator, for example. Here, provision can be made to set or control the temperature of the oil in a range between 100° C. and 120° C.

By incorporating the temperature control medium/oil heat exchanger into the temperature control circuit, heat transfer between the temperature control medium and the oil can be enabled, thus making it possible to dispense with a further coolant circuit for cooling the oil since the temperature control medium in the temperature control medium circuit assumes this function. In current embodiments, the oil is generally cooled by an air/oil heat exchanger situated in the cooling package. The elimination of this heat exchanger makes it possible to gain valuable installation space, and the expensive oil lines can be significantly shorter.

According to other variant embodiments, the arrangement according to the disclosure can further include respective air cooling devices that are assigned to the battery and/or to the other electric components and/or to the temperature control medium/oil heat exchanger and have air guiding devices, wherein the control unit is additionally designed to output a control signal to the air cooling devices in order to control the air guiding devices in accordance with the respectively determined temperatures. As an option, closed-loop control of the air guiding devices can be provided. More accurate and more rapid temperature control of the battery and/or of the other electric components and/or of the temperature control medium/oil heat exchanger can thereby be achieved.

The air cooling devices can be designed as cooling openings in floor trim panels, for example. This embodiment has aerodynamic advantages. At cold ambient temperatures, the cooling effect can be suppressed by the possibility of providing a flap system that guides the relative wind as required in the direction of the component to be cooled. As an option, e.g. in the case of low driving speeds, the air cooling device can be designed as a fan.

According to other variant embodiments, the arrangement according to the disclosure can further include lines, e.g. pipes or hoses, for the fluid connection of the first section of the temperature control circuit to a cooling circuit of an internal combustion engine, a shutoff device for activating and deactivating the fluid connection, wherein the control unit is additionally designed to output a control signal to the shutoff device in order to activate and deactivate the fluid connection in accordance with the temperatures determined. In other words, the fluid connection between the temperature control circuit and the cooling circuit of the internal combustion engine can be interrupted or closed by outputting a corresponding control signal. As an option, corresponding closed-loop control can be performed.

The connection between the cooling circuit and the temperature control circuit can allow more rapid heating of the battery and/or of the other electric components, e.g. at cold ambient temperatures. This can be advantageous especially for the battery since the capacity to function of the battery is severely restricted at low temperatures.

According to other variant embodiments, the control unit of the arrangement can be designed to output a control signal to the pumping device of the temperature control circuit in order to increase or reduce the flow of temperature control medium. For example, the power of the pumping device can be increased or reduced. The variation of the flow of temperature control medium represents another manipulated variable for the open-loop or closed-loop control of the temperature of the battery and of the temperature of the other electric devices. It is thereby possible to achieve the desired temperature more quickly and to extend the possible temperature range.

A vehicle according to the disclosure has one of the arrangements described above. Here, a vehicle should be taken to mean any mobile type of transport, i.e. both a land vehicle and a watercraft or aircraft, e.g. a passenger car.

For example, the vehicle can be designed as an electric vehicle, a battery electric vehicle (BEV), or a hybrid electric vehicle (HEV).

A method according to the disclosure for the temperature control of a battery and of other electric components of a vehicle, wherein the battery is arranged in a first section of a temperature control circuit and the other electric components are arranged in a second section of the temperature control circuit, the second section being arranged in parallel with the first section, may include the following features: formation of a flow of temperature control medium in the temperature control circuit, determination of the temperatures of the battery and of the other electric components, and division of the flow of temperature control medium between the first section and the second section of the temperature control circuit in accordance with the temperatures determined. In other words, the division of the flow of temperature control medium is subjected to open-loop or closed-loop control in accordance with the temperatures determined.

These features can be carried out in the order in which they are mentioned, but they can also be carried out in a different order, depending on requirements.

The method according to the disclosure can be carried out by the above-explained arrangement according to the disclosure, for example. To this extent, the above statements made in explaining the arrangement according to the disclosure also serve to describe the method according to the disclosure. The advantages of the method according to the disclosure correspond to those of the arrangement according to the disclosure and of the corresponding variant embodiments thereof.

According to various variant embodiments, the method can further include temperature control of the temperature control medium, wherein the temperature of the temperature control medium is subjected to open-loop or closed-loop control in accordance with the temperatures determined.

According to other variant embodiments, the method can furthermore include determination of the temperature of an oil flowing through a temperature control medium/oil heat exchanger arranged in the second section of the temperature control circuit, wherein the flow of temperature control medium is additionally divided in accordance with the oil temperature determined.

According to other variant embodiments, the method can furthermore include cooling the battery and/or the other electric components and/or the temperature control medium/oil heat exchanger by respectively assigned air cooling devices having air guiding devices, wherein the air guiding devices are subjected to open-loop or closed-loop control in accordance with the respectively determined temperatures.

According to other variant embodiments, the method can furthermore include formation of a fluid connection between the temperature control circuit and a cooling circuit of an internal combustion engine, wherein the fluid connection is activated or deactivated in accordance with the temperatures determined.

Further advantages of the present disclosure are apparent from the description of the following illustrative embodiments and the figures. In the examples explained below, reference is made to the attached drawings, which form some of the examples and in which specific embodiments in which the disclosure can be carried out are shown for purposes of illustration.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
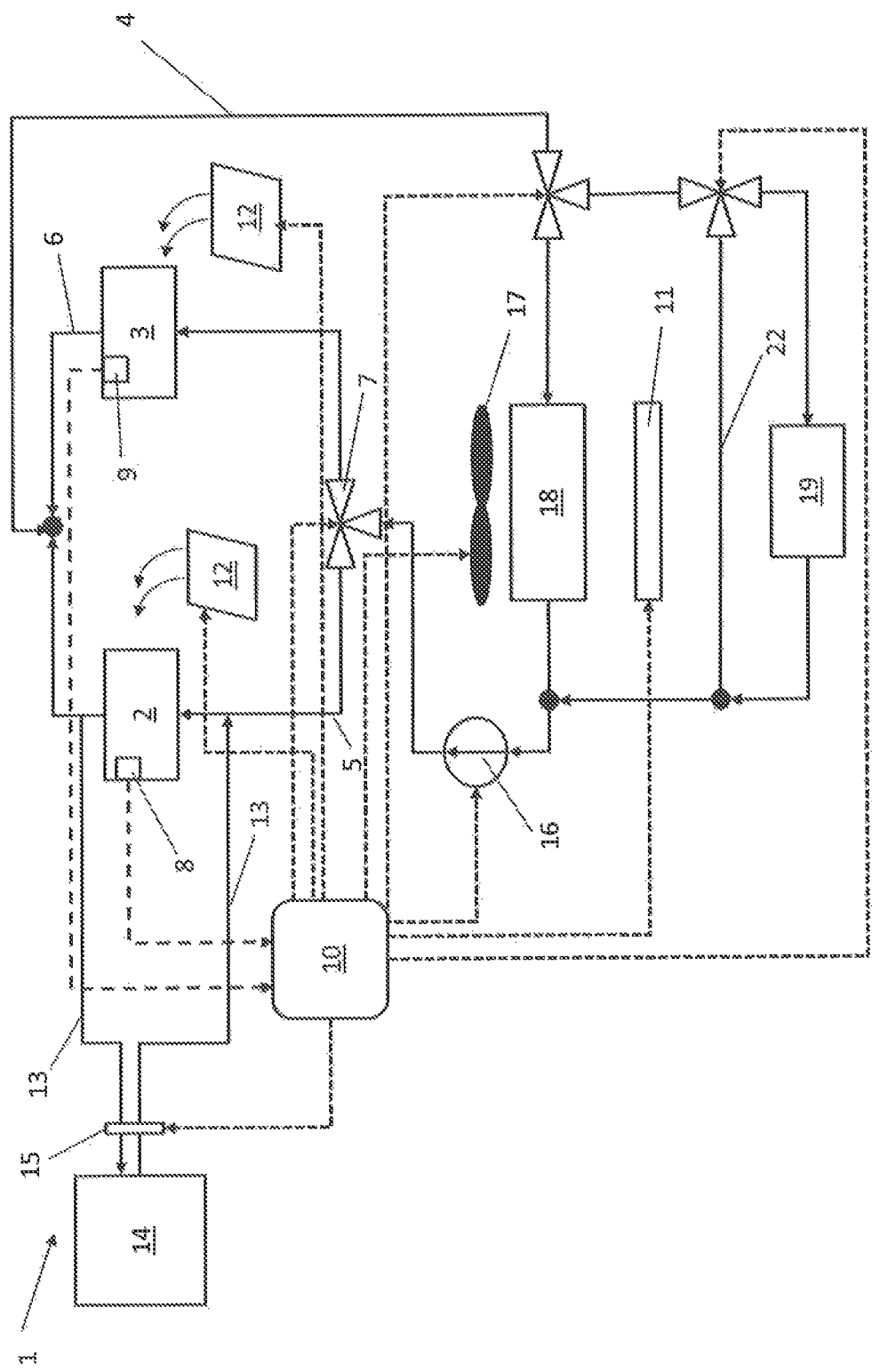
FIG. 1 shows a schematic illustration of an arrangement for the temperature control of a battery and of other electric components of a vehicle.

FIG. 1 shows an illustrative arrangement 1 for the temperature control of a battery 2 and of other electric components 3 of a vehicle. The arrangement has a temperature control circuit 4, through which a temperature control medium, water in the example, flows. The battery 2 is arranged in a first section 5 of the temperature control circuit 4, and the other electric components 3 are arranged in a second section 6. The first section 5 and the second section 6 are arranged in parallel with one another in respect of the flow of the temperature control medium.

A battery temperature sensor 8 is provided to determine the battery temperature, and another temperature sensor 9 is provided to determine the temperature of the other electric components 3. In the example, the other electric components 3 are the power electronics, the temperature of which should be in a range between 30° C. and 70° C. (86° F. and 158° F.), in one example. The setpoint temperature range of the battery 2 is, in one example, between 30° C. and 40° C. (86° F. and 104° F.).

By a flow control device 7 designed as a three-way valve, the flow of temperature control medium can be divided between the first section 5 and the second section 6. In the example, the division of the flow of temperature control medium is made with respect to time, with the result that the flow of temperature control medium flows alternately through the first section 5 and the second section 6. The changeover between the first section 5 and the second section 6 takes place according to the temperature requirements of the battery 2 and of the other electric components 3 respectively. For example, the flow of temperature control medium can be passed through the first section 5 for 60 seconds and then through the second section 6 for 20 seconds.

A pumping device 16 for the formation of the flow of temperature control medium in the temperature control circuit 4 is arranged in the temperature control circuit 4. The temperature control circuit 4 furthermore has two heat exchangers, a low-temperature radiator 18 and a temperature control medium/coolant heat exchanger 19. A bypass 22 is furthermore provided. The low-temperature radiator 18, the temperature control medium/coolant heat exchanger 19 and the bypass 22 are arranged in parallel with one another, wherein additional flow control devices 7, which are designed as a three-way valve, are provided for controlling the respective flows of temperature control medium through the low-temperature radiator 18, the temperature control medium/coolant heat exchanger 19 and the bypass 22.

The arrangement 1 furthermore has a control unit 10, which can receive and process input data from the two temperature sensors 8, 9 (dashed line in FIG. 1). Depending on the temperatures determined by the temperature sensors 8, 9, the control unit outputs a control signal to the flow control device 7 in order to control the division of the flow of temperature control medium between the first section 5 and the second section 6 of the temperature control circuit 4 (dotted line in FIG. 1). Further control signals are output to the two other flow control devices 7, which control the flow of temperature control medium through the low-temperature radiator 18, the temperature control medium/coolant heat exchanger 19 and the bypass 22.

In the variant embodiment shown in FIG. 1, a controllable air flap system 11 arranged adjacent to the low-temperature radiator 18 is furthermore provided for controlling the temperature of the temperature control medium. For this purpose, the control unit 10 additionally outputs a control signal to the air flaps of the air flap system 11, with the result that the air flaps are opened to a greater or lesser extent depending on the temperatures determined and hence more or less air can be fed to the low-temperature radiator 18.

The arrangement 1 furthermore has air cooling devices 12 having air guiding devices for cooling the battery 2 and the other electric components 3. A control signal is likewise output to these air cooling devices 12 by the control unit 10 in order to control the position of the air guiding devices (deflectors) and thus enable more or less cooling air to be guided in the direction of the battery 2 or the other electric components 3.

Further control signals are output to the pumping device 16 in order to control the pumping capacity and to a fan 17 arranged adjacent to the low-temperature radiator 18.

The first section 5 of the temperature control circuit 4 is in fluid connection with a cooling circuit 14 of an internal combustion engine (not shown) by lines 13. The fluid connection can be activated or deactivated by the shutoff device 15 by the control unit 10 outputting a corresponding control signal to the shutoff device 15 in accordance with the temperatures determined.

Figure 2:
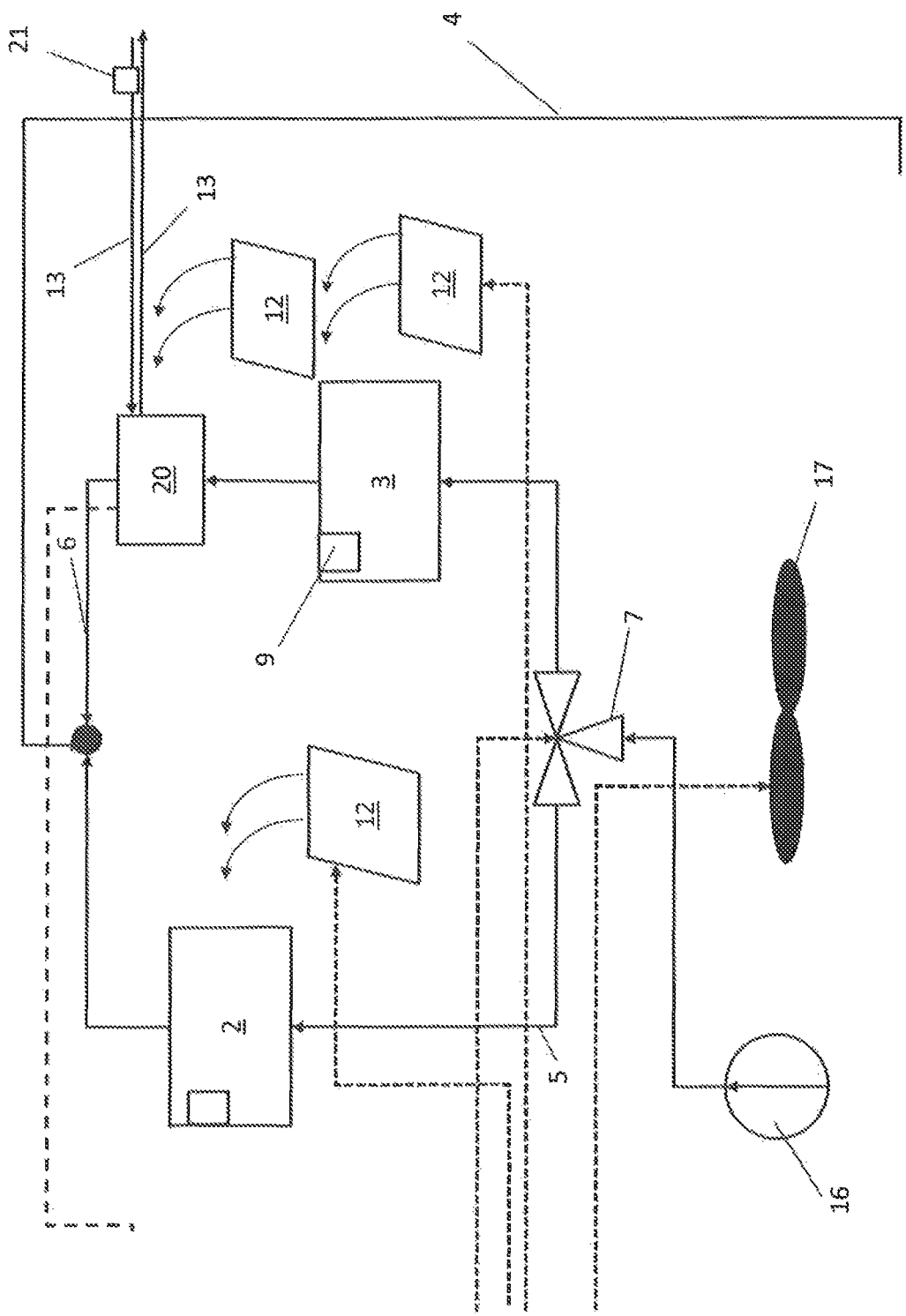
FIG. 2 shows another arrangement for the temperature control of a battery and of other electric components of a vehicle.

FIG. 2 shows a detail view of a second illustrative embodiment, in which a temperature control medium/oil heat exchanger 20 is provided in the second section 6 of the temperature control circuit 4 in contrast to the first illustrative embodiment shown in FIG. 1. The oil temperature-controlled by the temperature control medium/oil heat exchanger 20 may be used to cool a transmission, an electric motor, and a generator.

The temperature of the oil is determined by an oil temperature sensor 21. The associated measurement signals are received as input data by the control unit 10, processed and taken into account when outputting the control signal to control the division of the flow of temperature control medium between the first section 5 and the second section 6 of the temperature control circuit 4 by the flow control device 7.

The expression "and/or" employed here, when used in a series of two or more elements, means that each of the elements presented can be used alone, or any combination of two or more of the elements presented can be used. If, for example, the description of an assembly states that it contains components A, B and/or C, the assembly can contain A alone; B alone; C alone; A and B in combination; A and C in combination; B and C in combination; or A, B and C in combination.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle temperature control circuit, comprising:
   a battery positioned in a first section of the vehicle temperature control circuit;
   an electric component positioned in a second section of the vehicle temperature control circuit, wherein the first section and the section are arranged in parallel, and further wherein the electric component is a non-battery component;
   a three-way valve configured to divide a temperature control medium between the first section and the second section;
   a first temperature sensor for determining a temperature of the battery;
   a second temperature sensor for determining a temperature of the electric component; and
   a control unit configured to output a first control signal to the three-way valve in order to alternately divide a flow of the temperature control medium between the first section and the second section based on the temperatures determined by the first and second temperature sensors.

2. The vehicle temperature control circuit as recited in claim 1, comprising:
   a first air cooling device configured to direct a first amount of cooling air to the battery; and
   a second air cooling device configured to direct a second amount of cooling air to the electric component.

3. The vehicle temperature control circuit as recited in claim 2, wherein the control unit is configured to output a second control signal to the first air cooling device for controlling a position of a first air guiding device and is configured to output a third control signal to the second air cooling device for controlling a position of a second air guiding device.

4. The vehicle temperature control circuit as recited in claim 2, wherein the first and second air cooling devices include cooling openings formed in a floor trim panel.

5. The vehicle temperature control circuit as recited in claim 1, comprising:
   a first heat exchanger;
   a second heat exchanger; and
   a controllable air flap system arranged adjacent to the first heat exchanger or the second heat exchanger and configured to direct an airflow across the first heat exchanger or the second heat exchanger for altering a temperature of the temperature control medium.

6. The vehicle temperature control circuit as recited in claim 5, wherein the controllable air flap system includes an active grille shutter.

7. The vehicle temperature control circuit as recited in claim 1, comprising:
   a temperature control medium/oil heat exchanger arranged in the second section of the vehicle temperature control circuit; and
   an oil temperature determination device for determining the temperature of an oil flowing through the temperature control medium/oil heat exchanger,
   wherein the control unit is additionally configured to receive and process input data from the oil temperature determination device and to output a second control signal to the three-way valve in order to control the division of the flow of temperature control medium between the first section and the second section in accordance with the temperatures determined.

8. The vehicle temperature control circuit as recited in claim 1, comprising:
   lines for the fluid connection of the first section of the vehicle temperature control circuit to a cooling circuit of an internal combustion engine; and
   a shutoff device for activating and deactivating the fluid connection,
   wherein the control unit is additionally configured to output a second control signal to the shutoff device in order to activate and deactivate the fluid connection in accordance with the temperatures determined.

9. The vehicle temperature control circuit as recited in claim 1, comprising:
- a first air cooling device configured to direct a first amount of cooling air to the battery;
- a second air cooling device configured to direct a second amount of cooling air to the electric component;
- a low temperature radiator;
- a fan arranged adjacent to the low temperature radiator;
- a heat exchanger; and
- a controllable air flap system arranged to direct an airflow across the heat exchanger or the low temperature radiator for altering a temperature of the temperature control medium.

10. The vehicle temperature control circuit as recited in claim 9, comprising:
- a second three-way valve configured to control a flow of the temperature control medium through the low temperature radiator.

11. The vehicle temperature control circuit as recited in claim 10, comprising:
- a third three-way valve configured to control a flow of the temperature control medium through the heat exchanger.

12. The vehicle temperature control circuit as recited in claim 9, comprising:
- a bypass arranged in parallel with the low temperature radiator and the heat exchanger.

13. The vehicle temperature control circuit as recited in claim 1, wherein the control unit is configured to command the three-way valve to alternately provide the flow of the temperature control medium through the first section for a first time period and then through the second section for a second, different time period.

14. The vehicle temperature control circuit as recited in claim 13, wherein the first time period is for 5 to 60 seconds and the second, different time period is for 6 to 20 seconds.

15. The vehicle temperature control circuit as recited in claim 1, wherein the temperature control medium is water or air.

16. The vehicle temperature control circuit as recited in claim 1, wherein the battery includes a first temperature range between 30° and 40° C., and the electric component includes a second temperature range between 30° and 70° C.

17. The vehicle temperature control circuit as recited in claim 1, wherein the electric component is part of a power electronics of the vehicle temperature control circuit.

18. The vehicle temperature control circuit as recited in claim 1, wherein the three-way valve is a three-way servo valve.

19. The vehicle temperature control circuit as recited in claim 1, wherein the control unit is configured to command the three-way valve to provide a first volume of the temperature control medium through the first section and a second volume of the temperature control medium through the second section, wherein the first volume is larger than the second volume.

20. The vehicle temperature control circuit as recited in claim 1, wherein the control unit is a closed loop control unit.

* * * * *